US010895799B2

(12) United States Patent
Hu et al.

(10) Patent No.: US 10,895,799 B2
(45) Date of Patent: Jan. 19, 2021

(54) METHOD AND DEVICE FOR IDENTIFYING FLASHING LIGHT SOURCE

(71) Applicant: Guangdong Virtual Reality Technology Co., Ltd., Guangzhou (CN)

(72) Inventors: Yongtao Hu, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 108 days.

(21) Appl. No.: 16/231,620

(22) Filed: Dec. 24, 2018

(65) Prior Publication Data
US 2020/0209712 A1 Jul. 2, 2020

Related U.S. Application Data

(63) Continuation of application No. PCT/CN2016/090082, filed on Jul. 14, 2016.

(51) Int. Cl.
*G03B 7/16* (2014.01)
*H05B 47/12* (2020.01)
(Continued)

(52) U.S. Cl.
CPC .............. *G03B 7/16* (2013.01); *G06F 17/141* (2013.01); *G06F 17/142* (2013.01);
(Continued)

(58) Field of Classification Search
CPC .. G03B 7/16; G03B 15/02–05; H05B 47/125; H04N 5/2354; H04N 5/2256;
(Continued)

(56) References Cited

U.S. PATENT DOCUMENTS

2013/0236007 A1* 9/2013 Munro .............. H04W 12/0401
380/44
2014/0126835 A1* 5/2014 Shioya ............... H04N 5/23293
382/274

(Continued)

FOREIGN PATENT DOCUMENTS

| CN | 1882041 A | 12/2006 |
| CN | 103051843 A | 4/2013 |
| CN | 103383446 A | 11/2013 |

OTHER PUBLICATIONS

International Search Report issued in corresponding International application No. 2016090082, dated Mar. 29, 2017(7 pages).

*Primary Examiner* — Abdelaaziz Tissire

(57) ABSTRACT

The present disclosure provides a method and device for identifying a flashing light source. The method includes as follows. A processor obtains an image captured via a rolling shutter image sensor, the rolling shutter image sensor capturing an image of an environmental background, wherein the environmental background may include movable flashing light sources. A processor obtains stripe sets in the image, wherein the stripe sets can be obtained by capturing the flashing light sources via the rolling shutter image sensor. A processor takes a center of each stripe set as a reference point, and samples along a first direction to obtain n sampling points. A processor identifies the flashing light source by processing the n sampling points. With this disclosure, the identifying automatically of the flashing light source can be achieved.

20 Claims, 3 Drawing Sheets

(51) Int. Cl.
  *H04N 5/235* (2006.01)
  *H04N 5/225* (2006.01)
  *G06F 17/14* (2006.01)
  *H05B 47/125* (2020.01)
  *G06F 17/15* (2006.01)

(52) U.S. Cl.
  CPC ......... *G06F 17/156* (2013.01); *H04N 5/2256* (2013.01); *H04N 5/2354* (2013.01); *H05B 47/125* (2020.01)

(58) Field of Classification Search
  CPC ... F21K 5/023; F21K 5/026; G06K 2209/401; G06F 17/14; G06F 17/141; G06F 17/142; G06F 17/144; G06F 17/156; H03H 17/0213; H03H 2017/0214
  See application file for complete search history.

(56) References Cited

U.S. PATENT DOCUMENTS

| | | | | |
|---|---|---|---|---|
| 2014/0301737 | A1* | 10/2014 | Guo | H05B 47/125 |
| | | | | 398/118 |
| 2014/0372072 | A1* | 12/2014 | Guo | H05B 47/19 |
| | | | | 702/150 |
| 2017/0317663 | A1* | 11/2017 | Zhuang | H03H 17/0213 |
| 2018/0173327 | A1* | 6/2018 | He | G06F 3/0325 |
| 2019/0042813 | A1* | 2/2019 | Jang | H04B 10/114 |
| 2019/0392590 | A1* | 12/2019 | Hu | G06K 9/4661 |

\* cited by examiner

METHOD AND DEVICE FOR IDENTIFYING FLASHING LIGHT SOURCE

CROSS-REFERENCE TO RELATED APPLICATION

The present application is a continuation-application of International (PCT) Patent Application No. PCT/CN2016/090082, titled "METHOD AND DEVICE FOR IDENTIFYING FLASHING LIGHT SOURCE" and filed on Jul. 14, 2016. The entirety of the above-mentioned application is hereby incorporated by reference herein.

TECHNICAL FIELD

The present disclosure relates to the field of virtual technology, and more particularly, to a method and device for identity flashing light source.

BACKGROUND

With the development of technology of human-machine interaction, using moving object such as swinging gesture to input instructions, to replace means of direct contact with computer device, has become a trend. And then, tracking human gestures or other object motion states has become a problem that needs to be solved. A motion tracking system can capture images of light sources on moving objects by means of image processing, identify the moving objects according to the characteristics of the light sources, and then realize tracking of the moving objects. However, it is still a technical problem to identify the light source according to the stripe image formed by the light source.

SUMMARY

In order to identify flashing light source automatically, the embodiments of the present disclosure provide a method and a device for identifying a flashing light source.

In a first aspect, the present disclosure provides a method for identifying flashing light source. The method may include the following. A processor obtains an image captured via a rolling shutter image sensor, the rolling shutter image sensor capturing an image of an environmental background, wherein the environmental background may include flashing light sources, and the flashing light sources may be movable. A processor obtains stripe sets in the image, wherein the stripe sets can be obtained by capturing the flashing light sources via the rolling shutter image sensor. A processor takes a center of each stripe set as a reference point, and samples along a first direction to obtain n sampling points $(d_1, d_2, \ldots, d_n)$. A processor identifies the flashing light source by processing the n sampling points $(d_1, d_2, \ldots, d_n)$.

Combining the first aspect, in some embodiments, the first direction may be a direction perpendicular to an extending direction of stripes in the stripe set.

Combining any of the above embodiments of the first aspect, in some embodiments, a processor extends the n sampling points $(d_1, d_2, \ldots, d_n)$ periodically to obtain N calculation, points, wherein N is greater than n.

Combining any of the above embodiments of the first aspect, in some embodiments, a processor transforms the N calculation points to frequency domain to obtain frequency domain data, and identifies the flashing light source according to the frequency domain data.

Combining any of the above embodiments of the first aspect, in some embodiments, a coordinate system can be established, the origin of the coordinate system may be the position of the top left pixel of the image, the positive direction of the x-axis may be the rightward direction of the image, and the positive direction of the y-axis may be the downward direction of the image. The center $(u_0, v_0)$ of each stripe set can be obtained after establishing the coordinate system.

Combining any of the above embodiments of the first aspect, in some embodiments, n sampling points $(d_1, d_2, \ldots, d_n)$ may be extended periodically, and the period may be k cycles, thus N calculation points $$[\underbrace{(d_1, d_2, \ldots, d_n), (d_1, d_2, \ldots, d_n), \ldots (d_1, d_2, \ldots, d_n)}_{k \text{ cycles}}]$$

may be obtained, wherein, N is equal to n multiply (k−1) and plus m, m is less than or equal to n.

Combining any of the above embodiments of the first aspect, in some embodiments, when the first direction is a direction parallel to the width of the image and the center of the stripe set is taken as the reference point of the first direction, the processor can obtain n sampling points $$\left\{ d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right) \right\}$$

by sampling along the first direction. In some embodiments, when the first direction is a direction perpendicular to the width of the image and the center of the stripe set is taken as the reference point of the first direction, the processor can obtain n sampling points $$\left\{ d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right) \right\}$$

by sampling along the first direction.

Combining any of the above embodiments of the first aspect, in some embodiments, the center of the stripe set may be a gray-scale center of the stripe set, a geometric center of the stripe set, or an energy center of the stripe set.

Combining any of the above embodiments of the first aspect, in some embodiments, the frequency domain data may be a combination of any one or more of amplitude data, energy data, and phase data.

In a second aspect, the present disclosure provides a device for identifying flashing light source. The device may include an obtaining module, a sampling module, and a processing module. The obtaining module may be configured to obtain an image via a rolling shutter image sensor capturing an image of an environmental background, wherein the environmental background may include flashing light sources, and the flashing light sources may be movable; and configured to obtain stripe sets in the image, wherein the stripe sets can be obtained by capturing the flashing light sources via the rolling shutter image sensor. The sampling module may be configured to take a center of each stripe set as a reference point, and sample along a first direction to obtain n sampling points $(d_1, d_2, \ldots, d_n)$. The processing module may be configured to process the n sampling points $(d_1, d_2, \ldots, d_n)$ to identify the flashing light source.

Combining the second aspect, in some embodiments, the first direction may be a direction perpendicular to an extending direction of stripes in the stripe set.

Combining any of the above embodiments of the second aspect, in some embodiments, the processing module may include an extending unit. The extending unit may be configured to extend the n sampling points $(d_1, d_2, \ldots, d_n)$ periodically to obtain N calculation points, wherein N is greater than n.

Combining any of the above embodiments of the second aspect, in some embodiments, the processing module may further include a transforming unit. The transforming unit may be configured to transform frequency domain for the N calculation points to obtain frequency domain data, and identify the flashing light source according to the frequency domain data.

Combining any of the above embodiments of the second aspect, in some embodiments, a coordinate system can be established, the origin of the coordinate system may be the position of the top left pixel of the image, the positive direction of the x-axis may be the rightward direction of the image, and the positive direction of the y-axis may be the downward direction of the image. The center $(u_0, v_0)$ of each stripe set can be obtained after establishing the coordinate system.

Combining any of the above embodiments of the second aspect, in some embodiments, the extending unit may be configured to extend the a sampling points $(d_1, d_2, \ldots, d_n)$ periodically, and the period may be k cycles, to obtain N calculation points $$\left[ \underbrace{(d_1, d_2, \ldots, d_n), (d_1, d_2, \ldots, d_n), \ldots (d_1, d_2, \ldots, d_n)}_{k \text{ cycles}} \right],$$

wherein, N is equal to n multiply (k−1) and plus m, m is less than or equal to n.

Combining any of the above embodiments of the second aspect, in some embodiments, the sampling module may be configured to take the center of the stripe set as the reference point of the first direction, and sample along the first direction to obtain n sampling points $$\left\{ d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right) \right\}.$$

In some embodiments, when the first direction is a direction perpendicular to the width of the image, the sampling module may be configured to take the center of the stripe set as the reference point of the first direction, and sample along the first direction to obtain n sampling points $$\left\{ d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right) \right\}.$$

Combining any of the above embodiments of the second aspect, in some embodiments, the center of the stripe set may be a gray-scale center of the stripe set, a geometric center of the stripe set, or an energy center of the stripe set.

Combining any of the above embodiments of the second aspect, in some embodiments, the frequency domain data may be a combination of any one or more of amplitude data, energy data, and phase data.

In a third aspect, the present disclosure provides a device. The device may include a processor, and a memory. The memory may store executable program code. The processor runs a program corresponding to the executable program code by reading the executable program code stored in the memory, to execute the method for identifying a flashing light source. Wherein, the method is the method as described in the first aspect.

In a forth aspect, the present disclosure provides a medium. The medium may be configured to store an application, and the application may be configured to execute the method for identifying a flashing light source provided in the first aspect.

In a fifth aspect, the present disclosure provides an application. The application is configured to execute the method for identifying a flashing light source provided in the first aspect.

The embodiments of the present disclosure obtain stripe sets in the image, and sample along the first direction to obtain n sampling points $(d_1, d_2, \ldots, d_n)$ by taking a center of the stripe set as a reference point. The flashing light source can be identified by processing the n sampling points $(d_1, d_2, \ldots, d_n)$. The method in the above embodiments can identify the flashing light source automatically, and solves the problem of identifying automatically of the flashing light source which is hoped to be solved but has not been solved.

BRIEF DESCRIPTION OF THE DRAWINGS

In order to more Clearly illustrate the embodiments of the present disclosure, the drawings used in the embodiments will be briefly described below. Obviously, the drawings in the following description are only some embodiments of the present disclosure, and those skilled in the art can obtain other drawings according to the drawings without any creative work.

DETAILED DESCRIPTION OF PREFERRED EMBODIMENTS

The technical solutions in the embodiments of the present disclosure will be clearly and completely described in the following with reference to the accompanying drawings. It is apparent that the described embodiments are only a part of the embodiments of the disclosure, and not all of them. All other embodiments obtained by those skilled in the art based on the embodiments of the present invention without creative efforts are within the scope of the present invention.

Figure 1:
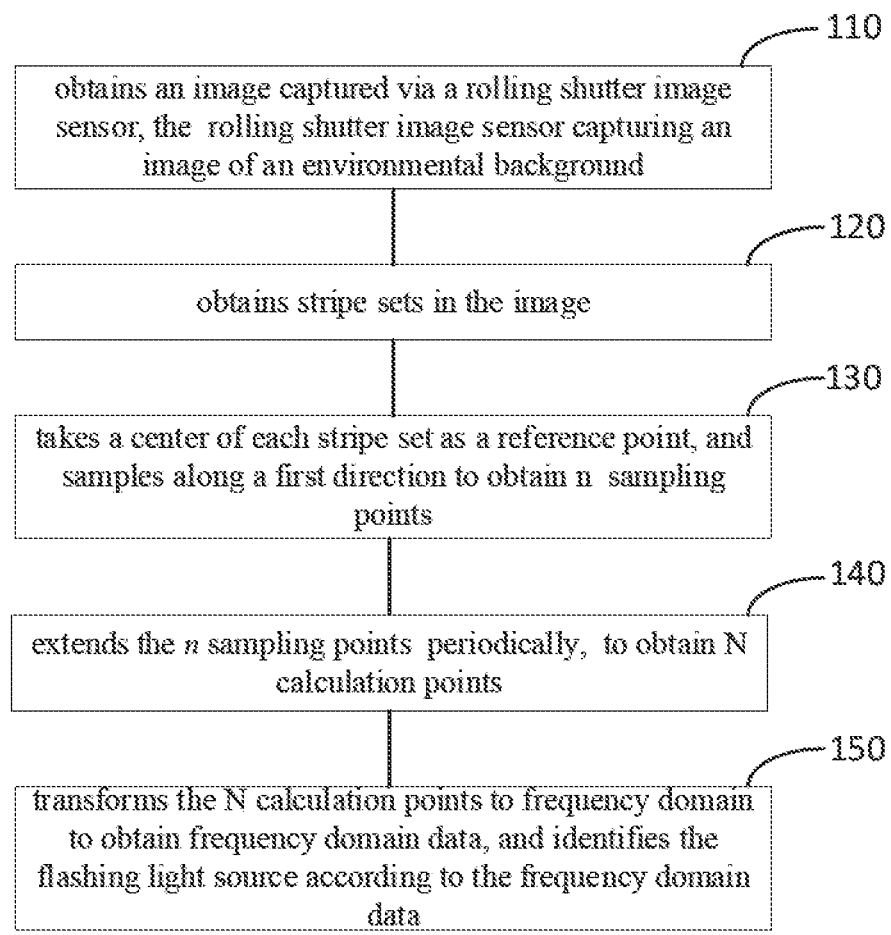
FIG. 1 illustrates a flow chart showing a method for identifying flashing light source according to embodiments of the disclosure.

FIG. 1 is a flow chart schematically illustrating a method for identifying a flashing light source according to an embodiment of the present disclosure. As illustrated in FIG. 1, the method for identifying a light source includes the flowing blocks.

At block 110, a processor obtains an image captured via a rolling shutter image sensor, the rolling shutter image sensor configured to capture an image of environmental background, wherein the environmental background can include flashing light sources, and the flashing light sources can be movable, stripe sets can be obtained by capturing the flashing light sources via the rolling shutter image sensor.

The rolling shutter image sensor may be an image sensor with a rolling shutter, such as, a Complementary Metal Oxide Semiconductor (CMOS) sensor includes an electronic rolling shutter, a Charge Coupling Element (CCD) sensor includes a rolling shutter, or the like.

The flashing light source may have a relatively stable flashing frequency or a changing flashing frequency, for example, an LED or the like. By controlling the duty cycle of the power input to the LED, it is possible to control the LED flashing at a fixed frequency or a non-fixed frequency, wherein the flashing frequency of the flashing light source is greater than the scanning frequency of the rolling shutter image sensor.

Figure 2:
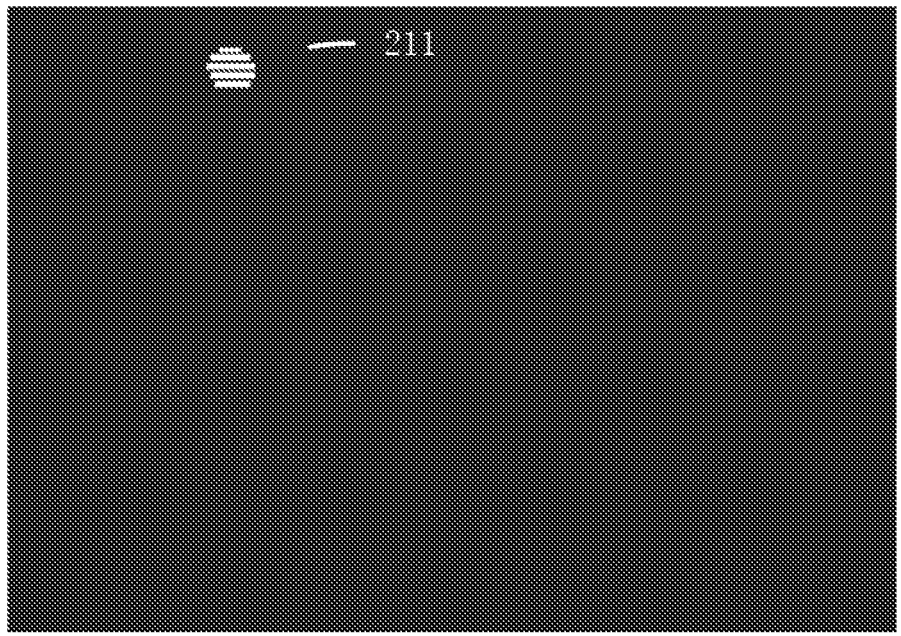
FIG. 2 illustrates a schematic view of a flashing light source set in a method for identifying flashing light source according to embodiments of the present disclosure.

The flashing light source can be captured by the rolling shutter image sensor, and a pattern of alternating dark/white stripes can be formed in the horizontal direction of the image. As shown in FIG. 2, a stripe set 211 with alternating dark/white stripes may appear in the image after scanning the flashing light source by the rolling shutter image sensor. Specifically, if the flashing light source is "on", when the rolling shutter image sensor scans the flashing light source, a white stripe corresponding to the flashing light source may appear in the image. If the flashing light source is "off", when the rolling shutter image sensor scans the flashing light source, a dark stripe corresponding to the flashing light source may appear in the image. In general, the stripe set in the image may include a pattern of alternating dark/white stripes formed by exposing the flashing light source.

For easy discussion and illustration, the white stripes will be used to as an example in the following description. The shape of the outline of the stripe set in the image is related to the shape of the flashing light source. For example, if the shape of the flashing light source is circular, the stripe set may include a plurality of white stripes with different lengths, and the outline of the stripe set is circular. If the shape of the light source is rectangular, the stripe set may include some white stripes with same length, and the outline of the stripe set is rectangular. The width of the white stripes in the stripe set are related to the flashing period of the flashing light source, for example, the longer flashing period of the flashing light source may produce the wider width of the white stripes. Under extreme conditions, if the flashing period of the flashing light source is infinite, the flashing light source will form an all-bright spot on the image without stripes.

In some embodiments, the movable light source in the environmental background is identified by the rolling shutter image sensor in a stationary or moving state. Different from the identified of stationary objects, it has a good tracking effect in tracking and identifying moving targets with light source. With the easy adhesion and portability of the flashing light source, the application scene and application mode of identifying the target object are expanded, which has great application value in industry and life.

At block 120, a processor obtains stripe sets in the image.

At block 130, a processor takes a center of each stripe set as a reference point, and samples along a first direction to obtain n sampling points $(d_1, d_2, \ldots d_n)$.

In some embodiments, a coordinate system can be established, the center of the coordinate system may be the upper left corner of the image, the positive direction of the x-axis may be the rightward direction of the image, and the positive direction of the y-axis may be the downward direction of the image. The center of the coordinate system may be established at other points of the image according to actual needs. The first direction may be a direction perpendicular to an extending direction of stripes in the stripe set. In this embodiment, the first direction is the positive direction of the y-axis. The center $(u_0, v_0)$ of each stripe set can be calculated after establishing the coordinate system. Taking the center of the stripe set as a reference point, n sampling point $(d_1, d_2, \ldots, d_n)$ can be obtained by sampling along the first direction. Wherein, the center of the stripe set may be a gray-scale center of the stripe set, a geometric center of the stripe set, or an energy center of the stripe set; $u_0$ is a coordinate value of the center on the x-axis, and $v_0$ is a coordinate value of the center on the y-axis.

In some embodiments, the center of the stripe set is a gray-scale center, the method for calculating the center of the stripe set may be specifically as follows. The processor can obtain the gray-scale value of each pixel in the image, and calculate the gray-scale center of the stripe set according to formula (1).

$$\begin{cases} u_0 = \dfrac{\left(\sum_{i=1}^{k} u_i \times \text{gray}(u_i, v_i)\right)}{\sum_{i=1}^{k} \text{gray}(u_i, v_i)} \\ v_0 = \dfrac{\left(\sum_{i=1}^{k} v_i \times \text{gray}(u_i, v_i)\right)}{\sum_{i=1}^{k} \text{gray}(u_i, v_i)} \end{cases} \quad \text{formula (1)}$$

Wherein, i is a serial number of the stripe set, pixels, k is a total number of pixels in the image, and i<k, $u_i$ is a coordinate value of the pixel i on the x-axis, $v_i$ is a coordinate value of the pixel i on the y-axis, and gray $(u_i, v_i)$ is the gray-scale value of the pixel i.

In some embodiments, taking the center $(u_0, v_0)$ of the stripe set as a reference point, sampling along the first direction to obtain n sampling point $(d_1, d_2, \ldots, d_n)$ may be as follows. When the first direction is a direction parallel to the width of the image, wherein the width direction of the image is the y-axis direction and the center of the stripe set is taken as the reference point of the first direction, the processor can obtain n sampling points $$\left\{ d_1 = \left(u_0, v_0 - \dfrac{n}{2}\right), d_2 = \left(u_0, v_0 - \dfrac{n-1}{2}\right), \ldots, d_n = \left(u_0, v_0 + \dfrac{n-1}{2}\right) \right\}$$

by sampling along the first direction.

At block 140, a processor extends the n sampling points $(d_1, d_2, \ldots, d_n)$ periodically to obtain N calculation points, wherein n is a positive integer greater than 1, and N is greater than n.

In some embodiments, n sampling points $(d_1, d_2, \ldots, d_n)$ may be extended periodically, and the period may be k cycles, thus N calculation points $$[\underbrace{(d_1, d_2, \ldots, d_n), (d_1, d_2, \ldots, d_n), \ldots (d_1, d_2, \ldots, d_n)}_{k \text{ cycles}}]$$

may be obtained wherein N is equal to n multiply (k−1) and plus m, m is less than or equal to n, $$m = N - \text{int}\left(\frac{N}{n}\right) * n.$$

Figure 3:
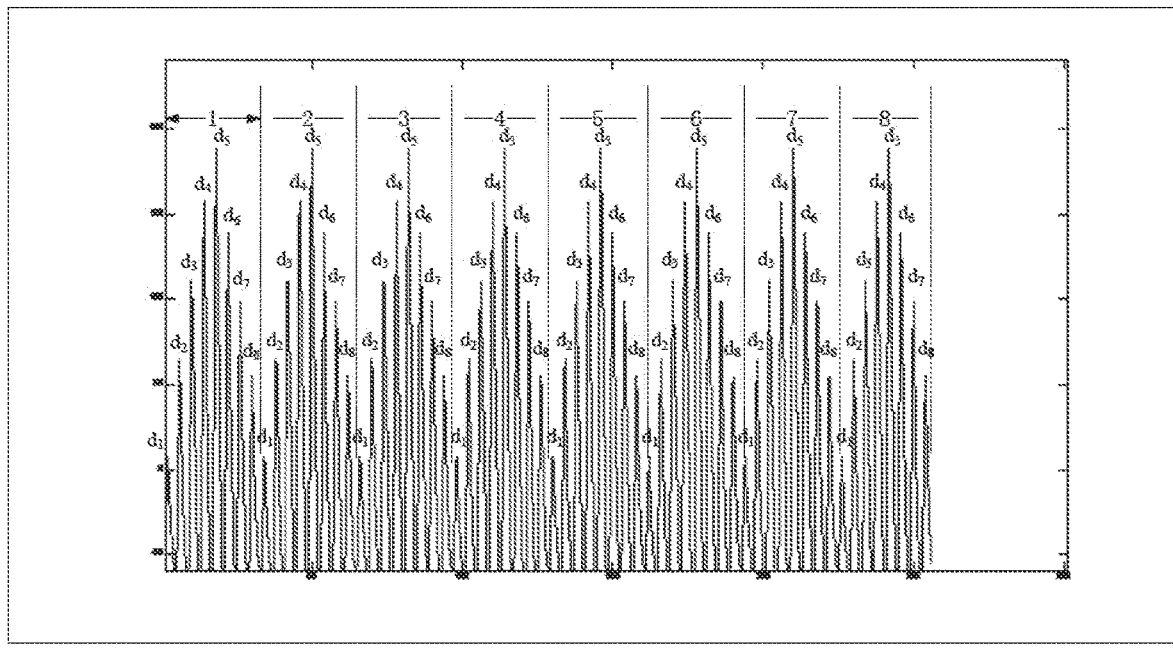
FIG. 3 is a waveform view after a sampling point period extension in a method for identifying flashing light source according to embodiments of the present disclosure.

As shown in FIG. 3, 8 protuberant waveforms are illustrated, each waveform includes 8 peaks, each peak corresponds to one sampling point in points $(d_1, d_2, \ldots, d_s)$, 256 calculation points can be obtained when extending sampling points with 8 cycles.

In an actual scene, the number of the sampling points may be the same or different when different stripe sets are sampled, and it is not limited in the present disclosure.

At block 150, a processor transforms the N calculation points to frequency domain to obtain frequency domain data, and identifies the flashing light source according to the frequency domain data.

Figure 4:
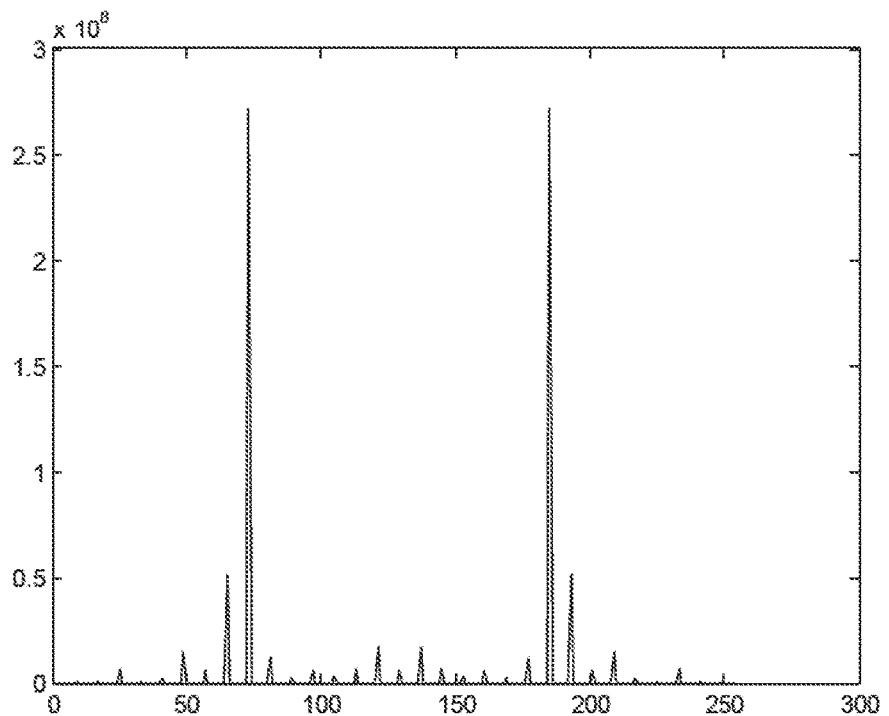
FIG. 4 is a waveform view after a waveform of FIG. 3 frequency domain transform according to embodiments of the present disclosure.

The frequency domain data can be obtained by transforming the N calculation points to frequency domain. Since the frequency domain data corresponds to the flashing light sources, the frequency domain data obtained from the different flashing light sources is different, the frequency domain data obtained from the same flashing light sources is same, thus, the flashing light source can be identified according to the frequency domain data. Wherein, transforming to the frequency domain can use a Fourier transform, a Laplace transform, a Z transform, and the like. The frequency domain data may be a combination of any one or more of amplitude data, energy data, and phase data. For example, the processor can obtain the waveform of the frequency domain data shown in FIG. 4 by performing Fourier transform on 256 calculation points shown in FIG. 3.

Figure 5:
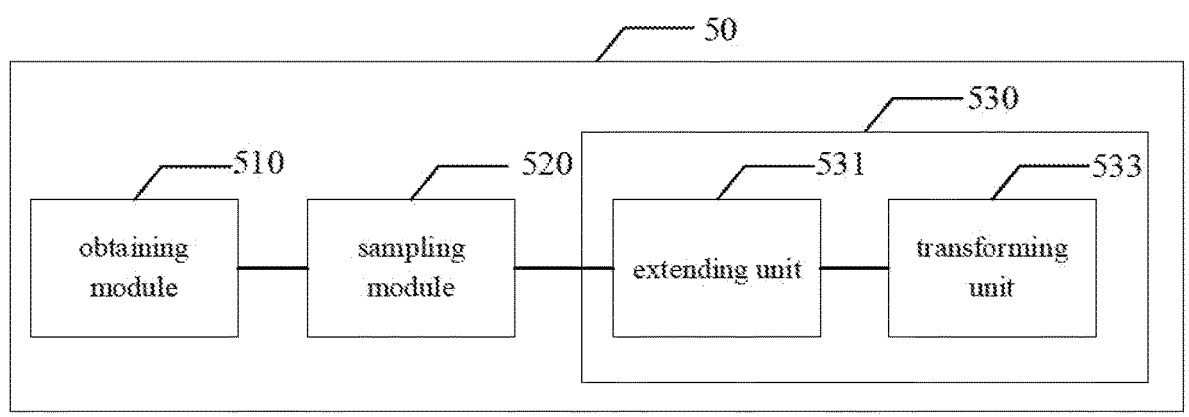
FIG. 5 illustrates a schematic view of a device for identifying flashing light source according to embodiments of the present disclosure.

FIG. 5 illustrates a schematic view of a device for identifying flashing light source according to embodiments of the present disclosure. The device 50 may include an obtaining module 510, a sampling module 520, and a processing module 530.

The obtaining module 510 may be configured to obtain an image via a rolling shutter image sensor capturing an image of an environmental background, wherein the environmental background may include flashing light sources, and the flashing light sources may be movable; and configured to obtain stripe sets in the image, wherein the stripe sets can be obtained by capturing the flashing light sources via the rolling shutter image sensor.

The sampling module 520 may be configured to take the center of each stripe set as a reference point, and sample along a first direction to obtain n sampling points $d_1, d_2, \ldots, d_n$).

The processing module 530 may be configured to process the a sampling points $(d_1, d_2, \ldots, d_n)$ to identify the flashing light source.

In some embodiments, the first direction may be a direction perpendicular to an extending direction of stripes in the stripe set.

In some embodiments, the processing module 530 may include an extending unit 531. The extending unit 531 may be configured to extend the a sampling points $(d_1, d_2, \ldots, d_n)$ periodically to obtain N calculation points, wherein N is greater than n.

In some embodiments, the processing module 530 may further include a transforming unit 533. The transforming unit 533 may be configured to transform the N calculation points to frequency domain to obtain frequency domain data, and identify the flashing light source according to the frequency domain data.

In some embodiments, a coordinate system can be established, the origin of the coordinate system may be the position of the top left pixel of the image, the positive direction of the x-axis may be the rightward direction of the image, and the positive direction of the y-axis may be the downward direction of the image. The center $(u_0, v_0)$ of each stripe set can be obtained after establishing the coordinate system.

In some embodiments, the extending unit 531 may be configured to extend the a sampling points $(d_1, d_2, \ldots, d_n)$ periodically, and the period may be k cycles, to obtain N calculation points $$[\underbrace{(d_1, d_2, \ldots, d_n), (d_1, d_2, \ldots, d_n), \ldots (d_1, d_2, \ldots, d_m)}_{k \text{ cycles}}],$$

wherein, N is equal to n multiply (k−1) and plus in, in is less than or equal to n.

In some embodiments, when the first direction is a direction parallel to the width of the image, the sampling module 520 may be configured to take the center of the stripe set as the reference point of the first direction, and sample along the first direction to obtain n sampling points $$\left\{d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right)\right\}.$$

In some embodiments, when the first direction is a direction perpendicular to the width of the image, the sampling module 520 may be configured to take the center of the stripe set as the reference point of the first direction, and sample along the first direction to obtain n sampling points $$\left\{d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right)\right\}.$$

In some embodiments, the center of the stripe set may be a gray-scale center of the stripe set, a geometric center of the stripe set, or an energy center of the stripe set.

In some embodiments, the frequency domain data may be a combination of any one or more of amplitude data, energy data, and phase data.

It is understandable that the functions of each functional unit of the device 50 in the embodiments can be realized according to the method as illustrated in FIG. 1, which will not be described here.

Figure 6:
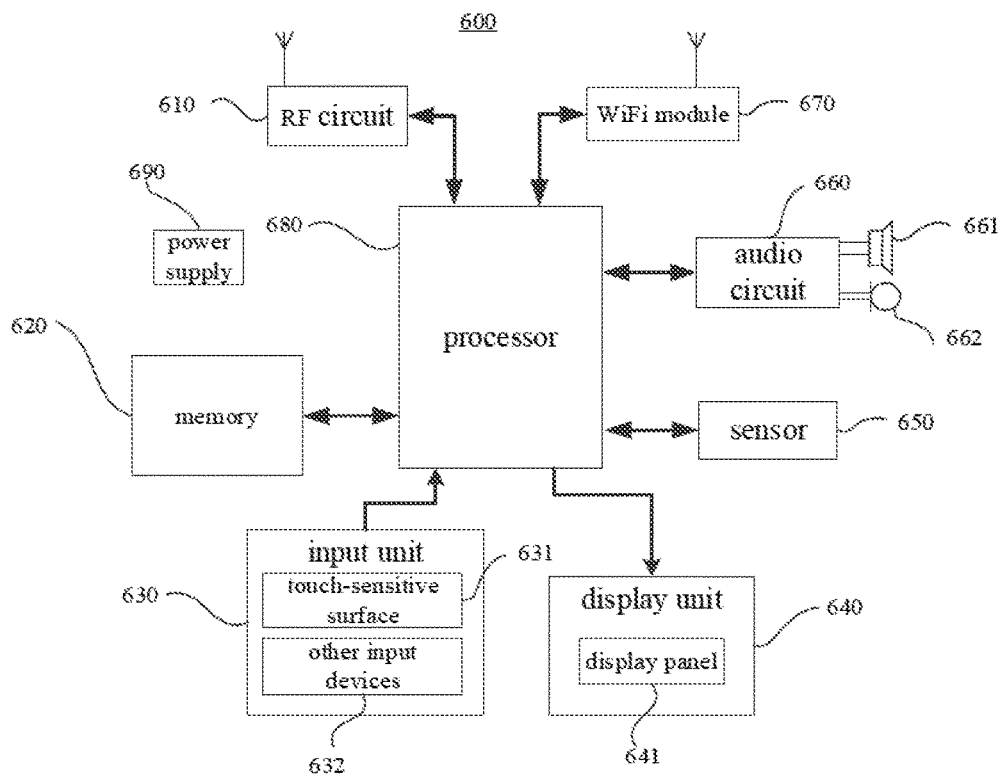
FIG. 6 illustrates a schematic view of a terminal according to embodiments of the present disclosure.

As illustrated in FIG. 6, the present disclosure further provides a device. Specifically, the device 600 may include an RF (radio frequency) circuit 610, a memory 620 having one or more a computer readable medium, an input unit 630, a display unit 640, a sensor 650, an audio circuit 660, a Wi-Fi (wireless fidelity) module 670, a processor 680 having one or more processing cores, and a power supply 690 and the like. It will be understood by those skilled in the art that the device structure shown in FIG. 6 does not constitute a limitation on the device and may include more or fewer components than illustrated, or to combine certain components, or different component arrangements.

Wherein. The RF circuit 610 may be used to receive and transmit information, or to receive and transmit signals during a call. The downlink information of the base station is received and processed by one or more processors 680, and the uplink data is transmitted to the base station. Typically, the RF circuit 610 may include, but is not limited to, an antenna, at least one amplifier, a tuner, one or more oscillators, a subscriber identity module (SIM) card, a transceiver, a coupler, an LNA (Low Noise Amplifier), a duplexes, etc. In addition, the RF circuit 610 may also communicate with the network and other devices by wireless communication. The wireless communication may use any communication standard or protocol including, but not limited to, GSM (Global System of Mobile communication), GPRS (General Packet Radio Service), CDMA (Code Division Multiple Access), WCDMA (Wideband Code Division Multiple Access) LTE (Long Term Evolution), e-mail, SMS (Short Messaging Service), and the like.

The memory 620 may be used to store software programs and modules. The processor 680 executes various functional applications and data processing by running software programs and modules stored in the memory 620. The memory 620 may mainly include a storage program area and a storage data area. Wherein the storage program area may store an operating system, at least one application program required for the function (such as voice playback, image playback and so on), and the like; the storage, data area may store data (such as audio data, telephone book, etc.) created according to the use of the device 600, and the like. In addition, the memory 620 may include high-speed random access memory, and also may include non-volatile memory, such as at least one disk storage device, flash memory device, or other volatile solid state memory device. Accordingly, the memory 620 may also include a memory controller to provide access to the memory 620 by the processor 680 and the input unit 630.

The input unit 630 may be used to receive input digital or character information and to generate a signal input of keyboard, mouse, joystick, optical or trackball related to user settings and function control. The input unit 630 may include a touch-sensitive surface 631 and other input devices 632. The touch-sensitive surface 631, also referred to as a touch screen or a touchpad, can collect a touch operation on or near the user (such as a user operation on the touch-sensitive surface 631 or near the touch-sensitive surface 631 using a finger or stylus or any suitable object or attachment) and drives the corresponding connection device according to a preset program. Alternatively, the touch-sensitive surface 631 may include both a touch detection device and a touch controller. Wherein the touch detection device detects a touching position of the user and detects a signal from the touch operation to transmit a signal to the touch controller. The touch controller receives the touch information from the touch detection device and converts it into contact coordinates and sends it to the processor 680 and can receive the command sent by the processor 680 and execute it. In addition, the touch-sensitive surface 631 can be realized by various types such as resistive, capacitive, infrared, and surface acoustic waves. In addition to the touch-sensitive surface 631, the input unit 630 may also include other input devices 632. Other input devices 632 may include, but are not limited to, one or more of physical keyboards, function keys (such as volume control keys, switch keys, etc.), trackballs, mice, joysticks, and the like.

The display unit 640 may be used to display information entered by the user or information provided to the user and various graphical user interfaces of the device 600, which may be constructed from graphics, text, icons, video, and any combination thereof. The display unit 640 may include a display panel 641, and the display panel 641 may be configured in the form of LCD (Liquid Crystal Display), OLED (Organic Light-Emitting Diode), or the like. Further, the touch-sensitive surface 631 may cover the display panel 641. If the touch-sensitive surface 631 detects a touch operation on or near it, the touch-sensitive surface 631 sent the result to the processor 680 to determine the type: of touch event. The processor 680 then provides a corresponding: visual output on the display panel 641 according to the type of touch event Although the touch-sensitive surface 631 and the display panel 641 are as two separate components in FIG. 9 to realize the input and input functions, but in some embodiments the touch-sensitive surface 631 may be integrated with the display panel 641 to achieve input and output function.

The device 600 may also include at least one sensor 660, such as a light sensor, a motion sensor, and other sensors. In particular, the light sensor may include an ambient light sensor and a proximity sensor, wherein the ambient light sensor may adjust the brightness of the display panel 641 in accordance with the shading of the ambient light, and the proximity sensor may turn off the display panel 641 and/or make the display panel 641 backlight when the device 600 is moved to the ear. As a kind of motion sensor, the gravitational acceleration sensor can detect the magnitude of the acceleration in all directions (usually three axes). When the gravity acceleration sensor is stationary, it can detect the size and direction of gravity, can be used to the application to identify the gesture of mobile phone gesture (such as vertical and horizontal screen switching, related games, magnetometer gesture calibration), vibration recognition related functions (such as pedometer, percussion) and so on. As for the device 600 can also be configured gyroscopes, barometers, hygrometers, thermometers, infrared sensors and other sensors, will not repeat them here.

An audio circuit 660, a speaker 661, and a microphone 662 may provide an audio interface between the user and the device 600. The audio circuit 660 may transmit the received electrical data converted by the received audio data to the speaker 661, and the speaker 661 converts the electrical signal into an audio signal output. On the other hand, the microphone 662 converts the captured sound signal into an electrical signal, the audio circuit 660 receives the electrical signal and converts it into audio data, outputs the audio data to the processor 680, the processor processes the audio data, the RF circuit 610 sends the processed audio data to, for example, another device, or outputs the audio data to the memory 620 for further processing. The audio circuit 660 may also include an ear plug jack to provide communication between the peripheral headset and the device 600.

WiFi is a short distance wireless transmission technology. Device 600 through the WiFi module 670 can help users send and receive e-mail, browse the web and access streaming media. WiFi provides users with wireless broadband Internet access. Although FIG. 6 shows the WiFi module 670, the WiFi module 670 does not belong to the necessary configuration of the device 600 and can be omitted as needed without departing from the spirit of the present disclosure.

The processor 680 is a control center of the device 600, and various parts of the entire phone are connected by various interfaces and lines. The processor 680 performs various functions and processing data of the device 600 by running or executing software programs and/or modules stored in the memory 620, and invoking the data stored in the memory 620, to monitor, the phone overall. In some embodiments, the processor 680 may include one or more processing cores. Preferably, the processor 680 may integrate an application processor and a modem processor. Among them, the application processor mainly handles the operating system, the user interface and the application program and so on. The modem processor mainly handles wireless communications. It will be appreciated that the above-described modem processor may not be integrated into the processor 680.

The device 600 also includes a power supply 690 (e.g., a battery) that supplies power to the various components. Preferably, the power supply may be logically connected to the processor 680 through a power management system to enable functions such as managing charging, discharging, and power management through the power management system. The power supply 690 may also include any one or more components such as DC or AC power, a recharging system, a power failure detection circuit, a power converter or an inverter, a power status indicator, and the like.

Although not shown, the device 600 may include a camera, a Bluetooth module and so on, and will not be described again. Specifically, in the embodiment, the display unit of the device is a touch screen display. The device also includes a memory, and one or more programs. Wherein one or more of the programs are stored in memory and configured to be executed by one or more processors. The one or more programs contain instructions for performing the following operations.

The processor 680 obtains an image via a rolling shutter image sensor, the rolling shutter image sensor capturing an image of an environmental background, wherein the environmental background may include flashing light sources, and the flashing light sources may be movable. The processor 680 obtains stripe sets in the image, wherein the stripe sets in the image can be obtained by capturing the flashing light sources via the rolling shutter image sensor. The processor 680 takes a center of each stripe set as a reference point, and samples along a first direction to obtain n sampling points $(d_1, d_2, \ldots, d_n)$. The processor 680 identifies the flashing light source by processing the n sampling points $(d_1, d_2, \ldots, d_n)$.

In some embodiments, the first direction may be a direction perpendicular to an extending direction of stripes in the stripe set.

In some embodiments, the processor 680 extends the n sampling points $(d_1, d_2, \ldots, d_n)$ periodically to obtain N calculation points, wherein N is greater than n.

In some embodiments, the processor 680 transforms the N calculation points to frequency domain to obtain frequency domain data, and identifies the flashing light source according to the frequency domain data.

In some embodiments, a coordinate system can be established, the origin of the coordinate system may be the position of the top left pixel of the image, the positive direction of the x-axis may be the rightward direction of the image, and the positive direction of the y-axis may be the downward direction of the image. The center $(u_0, v_0)$ of each stripe set can be obtained after establishing the coordinate system.

In some embodiments, n sampling points $(d_1, d_2, \ldots, d_n)$ may be extended periodically, and the period may be k cycles, thus N calculation points $$[\underbrace{(d_1, d_2, \ldots, d_n), (d_1, d_2, \ldots, d_n), \ldots (d_1, d_2, \ldots, d_m)}_{k\ cycles}]$$

may be obtained, wherein, N is equal to n multiply (k−1) and plus m, m is less than or equal to n.

In some embodiments, when the first direction is a direction parallel to the width of the image and the center of the stripe set is taken as the reference point of the first direction, the processor 680 can obtain n sampling points $$\left\{ d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right)\right\}$$

by sampling along the first direction. In some embodiments, when the first direction is a direction perpendicular to the width of the image and the center of the stripe set is taken as the reference point of the first direction the processor 680 can obtain n sampling points $$\left\{ d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right)\right\}$$

by sampling along the first direction.

In some embodiments, the center of the stripe set may be a gray-scale center of the stripe set, a geometric center of the stripe set, or an energy center of the stripe set.

In some embodiments, the frequency domain data may be a combination of any one or more of amplitude data, energy data, and phase data.

The embodiments of the present disclosure obtain stripe sets in the image, and sample along the first direction to obtain n sampling points $(d_1, d_2, \ldots, d_s)$ by taking a center of the stripe set as a reference point. The flashing light source can be identified by processing the n sampling points $(d_1, d_2, \ldots, d_s)$. The method in the above embodiments can identify the flashing light source automatically, and solves the problem of identifying automatically of the flashing light source which is hoped to be solved but has not been solved.

The nature of the technical solution of the present application, the part contributing to the prior art, or all or part of the technical solution may be embodied in the form of a software product. The computer software product is stored in a storage medium and includes instructions for causing a computer device (which may be a personal computer, a server, or a network device, etc.) or a processor to perform all or part steps of the method described in each of the embodiments of the present application. The aforementioned storage medium includes a variety of media such as a USB disk, a mobile hard disk, a read-only memory (ROM), a random access memory (RAM), a magnetic disk, or an optical disk, which can store program code.

The above embodiments are only optional embodiment of the present disclosure, and the scope of the present disclosure is not limited thereto. Equivalent variations in the claims of the present disclosure are still within the scope of the present disclosure.

What is claimed is:

1. A method for identifying a flashing light source, comprising:
   obtaining an image via a rolling shutter image sensor configured to capture an image of environmental background, wherein the environmental background includes movable flashing light sources;
   obtaining stripe sets in the image, wherein the stripe sets are obtained by capturing the flashing light sources via the rolling shutter image sensor;
   sampling along a first direction to obtain n sampling points $(d_1, d_2, \ldots, d_n)$, wherein the center of each stripe set is taken as a reference point;
   processing the n sampling points to identify the flashing light source, comprising: extending, the n sampling points periodically in k cycles, to obtain N calculation points $$[\underbrace{(d_1, d_2, \ldots, d_n), (d_1, d_2, \ldots, d_n), \ldots (d_1, d_2, \ldots, d_m)}_{k\ cycles}],$$

wherein N is greater than n, N is equal to n multiply (k−1) and plus m, m is less than or equal to n.

2. The method of claim 1, wherein the first direction is a direction perpendicular to an extending direction of stripes in the stripe set.

3. The method of claim 1, wherein processing the n sampling points, further comprises: transforming the N calculation points to frequency domain to obtain frequency domain data, and identifying the flashing light source according to the frequency domain data.

4. The method of claim 3, the frequency domain data is a combination of any one or more of amplitude data, energy data, and phase data.

5. The method of claim 1, further comprising: establishing a coordinate system to obtain the center $(u_o, v_o)$ of each stripe set, wherein the origin of the coordinate system is the position of the top left pixel of the image, the positive direction of the x-axis is the rightward direction of the image, and the positive direction of the y-axis is the downward direction of the image.

6. The method of claim 5, further comprising: sampling along the first direction to obtain n sampling points $$\left\{d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right)\right\},$$

wherein the first direction is a direction parallel to the width of the image, the center of each stripe set is taken as a reference point; or
sampling along the first direction to obtain n sampling points $$\left\{d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right)\right\},$$

wherein the first direction is a direction perpendicular to the width of the image, the center of each stripe set is taken as a reference point.

7. The method of claim 1, the center of the stripe set is a gray-scale center of the stripe set, a geometric center of the stripe set, or an energy center of the stripe set.

8. An electronic device, comprising: a rolling shutter image sensor configured to capture an image of environmental background; one or more processors; and a memory storing one or more programs configured to be executed by the one or more processors, the one or more programs including instructions for:
   obtaining an image via the rolling shutter image sensor, wherein the environmental background includes movable flashing light sources;
   obtaining stripe sets in the image, wherein the stripe sets are obtained by capturing the flashing light sources via the rolling shutter image sensor;
   sampling along a first direction to obtain n sampling points $(d_1, d_2, \ldots, d_n)$, wherein the center of each stripe set is taken as a reference point; and
   processing the n sampling points to identify the flashing light source, comprising: extending the n sampling points periodically in k cycles, to obtain N calculation points $$[\underbrace{(d_1, d_2, \ldots, d_n), (d_1, d_2, \ldots, d_n), \ldots (d_1, d_2, \ldots, d_m)}_{k\ cycles}],$$

wherein N is greater than n, N is equal to n multiply (k−1) and plus m, m is less than or equal to n.

9. The device of claim 8, wherein processing the n sampling points, further comprises: transforming the N calculation points to frequency domain to obtain frequency domain data, and identifying the flashing light source according to the frequency domain data.

10. The device of claim 8, the one or more programs further including instructions for: establishing a coordinate system to obtain the center $(u_o, v_o)$ of each stripe set, wherein the origin of the coordinate system is the position of the top left pixel of the image, the positive direction of the x-axis is the rightward direction of the image, and the positive direction of the y-axis is the downward direction of the image.

11. The device of claim 8, the one or more programs further including instructions for: sampling along the first direction to obtain n sampling points $$\left\{d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right)\right\},$$

wherein the first direction is a direction parallel to the width of the image, the center of each stripe set is taken as a reference point; or
sampling along the first direction to obtain n sampling points $$\left\{d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right)\right\},$$

wherein the first direction is a direction perpendicular to the width of the image, the center of each stripe set is taken as a reference point.

12. The device of claim 8, wherein the first direction is a direction perpendicular to an extending direction of stripes in the stripe set.

13. The device of claim 8, wherein the center of the stripe set is a gray-scale center of the stripe set, a geometric center of the stripe set, or an energy center of the stripe set.

14. The device of claim 8, wherein the frequency domain data is a combination of any one or more of amplitude data, energy data, and phase data.

15. A non-transitory computer readable medium storing on or more programs configured to be executed by one or more processors of an electronic device, the one or more programs comprising instruction for:
- obtaining an image via a rolling shutter image sensor configured to capture an image of an environmental background, wherein the environmental background includes movable flashing light sources;
- obtaining stripe sets in the image, wherein the stripe sets are obtained by capturing the flashing light sources through the rolling shutter image sensor;
- establishing a coordinate system to obtain the center ($u_o$, $v_0$) of each stripe set, wherein the origin of the coordinate system is at the upper left corner of the image, a positive direction of x-axis is the rightward direction of the image, and a positive direction of y-axis is the downward direction of the image;
- sampling along a first direction to obtain n sampling points ($d_1, d_2, \ldots, d_n$), wherein the center of each stripe set is taken as a reference point, n sampling points ($d_1, d_2, \ldots, d_n$) are determined by $$\left\{ d_1 = \left(u_0, v_0 - \frac{n}{2}\right), d_2 = \left(u_0, v_0 - \frac{n-1}{2}\right), \ldots, d_n = \left(u_0, v_0 + \frac{n-1}{2}\right) \right\}$$

when the first direction is parallel to the width of the image, and n sampling points ($d_1, d_2, \ldots, d_n$) are determined by $$\left\{ d_1 = \left(u_0 - \frac{n}{2}, v_0\right), d_2 = \left(u_0 - \frac{n-1}{2}, v_0\right), \ldots, d_n = \left(u_0 + \frac{n-1}{2}, v_0\right) \right\}$$

when the first direction is perpendicular to the width of the image; and processing the n sampling points to identify the flashing light source.

16. The medium of claim 15, wherein processing the n sampling points comprises:
- extending the n sampling points periodically to obtain N calculation points, wherein N is greater than n.

17. The medium of claim 16, wherein processing the n sampling points, further comprises: transforming the N calculation points to frequency domain to obtain frequency domain data, and identifying the flashing light source according to the frequency domain data.

18. The medium of claim 15, wherein the center of the stripe set is a gray-scale center of the stripe set, a geometric center of the stripe set, or an energy center of the stripe set.

19. The medium of claim 15, wherein the frequency domain data is a combination of any one or more of amplitude data, energy data, and phase data.

20. The medium of claim 15, wherein processing then sampling points to identify the flashing light source, comprises: extending, the n sampling points periodically in k cycles, to obtain N calculation points $$[\underbrace{(d_1, d_2, \ldots, d_n), (d_1, d_2, \ldots, d_n), \ldots (d_1, d_2, \ldots, d_m)}_{k\ cycles}],$$

wherein N is greater than n, N is equal to n multiply (k−1) and plus m, m is less than or equal to n.

* * * * *